United States Patent [19]

Clark

[11] E Re. 28,602

[45] Reissued Nov. 4, 1975

[54] DIFFERENTIAL DRIVE FOR TENSION ROLLERS

[75] Inventor: Anthony Philip Clark, Oakville, Canada

[73] Assignee: B & K Machinery International Limited, Etobicoke, Canada

[22] Filed: Oct. 23, 1974

[21] Appl. No.: 517,398

Related U.S. Patent Documents

Reissue of:

[64] Patent No.: 3,764,050
Issued: Oct. 9, 1973
Appl. No.: 226,739
Filed: Feb. 16, 1972

[52] U.S. Cl. ..... 226/25; 226/40; 226/111; 226/195

[51] Int. Cl.[2] ..... B65H 25/00

[58] Field of Search ..... 226/31, 40, 42, 111, 195, 226/25

[56] References Cited

UNITED STATES PATENTS

| | | | |
|---|---|---|---|
| 3,276,647 | 10/1966 | Lewis et al. | 226/31 |
| 3,280,737 | 10/1966 | Huck | 226/40 X |
| 3,312,126 | 4/1967 | Hering | 226/31 X |
| 3,539,085 | 11/1970 | Anderson et al. | 226/31 X |
| 3,608,799 | 9/1971 | Edson | 226/31 |

*Primary Examiner*—M. Henson Wood, Jr.
*Assistant Examiner*—Gene A. Church
*Attorney, Agent, or Firm*—George A. Rolston

[57] ABSTRACT

A drive for tension rolls incorporating differential gear systems for all rolls but one in any one bridle, and means for automatically regulating and adjusting the speed and/or torque of each of the differentially driven rolls with reference to a direct coupled roll in the group or bridle which is itself driven at a predetermined reference speed corresponding to the speed of the sheet metal itself. Preferably, in accordance with the practice of the invention the speed of each differentially driven roll is itself controlled by a sensor mounted on the drive shaft of the roll immediately preceding it or immediately following it in the roll train. Such a sensor may take the form of a straight forward tachometer, or may be in the form of a torque strain sensor. In this way, the speed of rotation and/or torque of each of the rolls in each of the bridles is controlled and synchronized with the speed of the sheet metal as it moves in unison with that particular roll, thereby minimizing and substantially eliminating any possibility of slippage between the roll and the sheet metal.

14 Claims, 5 Drawing Figures

DIFFERENTIAL DRIVE FOR TENSION ROLLERS

Matter enclosed in heavy brackets [ ] appears in the original patent but forms no part of this reissue specification; matter printed in italics indicates the additions made by reissue.

The present invention relates to a differential drive system for use in association with tensioning rolls in a sheet metal working line.

BACKGROUND OF THE INVENTION

In the art of continuous strip sheet metal working, it is frequently required to provide a group of so-called "tensioning" rolls at various different locations. Such a group of tensioning rolls will comprise two or more rolls arranged together and defining a path around which the strip of sheet metal must run to provide sufficient wrap to provide sufficient friction so as not to allow the strip to slip. A group of such tensioning rolls is referred to as a "bridle" and a particularly important usage of such tensioning rolls is found in strip sheet metal tensioner-leveller or stretcher levelling systems. In such leveller systems the sheet metal is tensioned between two such "bridles," i.e., is tensioned between two groups of such tensioning rolls, and between the bridles, there is often provided a group of levelling rolls through which the sheet metal passes, and by which it is worked in such a manner as to flatten and level the strip. In other cases the strip is merely stretched level between the two bridles.

In the use of such tensioning rolls, and in particular in the use described above in association with a leveller system, it is found that the strip of sheet metal becomes stretched due to the constant tension applied to it, and also in the case of the leveller system, due to the working of the metal strip throughout the individual bridle roll. Since all of the rolls in each tensioning bridle are driven at the same speed, in mechanical coupled bridle systems it is inevitably found that at some point or other in one or both of the bridles the strip and the particular roll around which it is passing are moving at different speeds. The causes of this are varied and could result from progressive elongation of the strip due to tension amplification from roll to roll or small differences in the diameter of the rolls. This causes very rapid abrasion of the surface of the rolls, and as a result, continued use of such rolls in their damaged condition will lead to surface damage of the strip metal. Damaged roll surface will also cause slippage between the strip and the roll resulting in variable tension condition between the bridles. This condition would not allow the levelling tensioning or stretching to be accurately controlled and would also inflict high loading peaks on the mechanical drive which could result in mechanical failures in the system. Consequently it is found that in such bridles the rolls must be replaced or resurfaced at frequent intervals, causing complete shutdown of the line while this is done with considerable inconvenience and expense and loss of production.

It is of course well known to provide a common drive system for use in association with two such bridles of tension rolls, with a differental gear system between the two bridles permitting the rolls in one bridle to be driven faster or slower than the rolls in the other. In this way, it is possible to make a certain degree of adjustment to the elongation of the strip due to the leveller treatment and/or strip elongation being applied between the bridles. However, this itself does not overcome in any way the problem of elongation of the strip occurring as between rolls within any one bridle, and where such elongation occurs it continues to cause severe problems.

BRIEF SUMMARY OF THE INVENTION

The present invention therefore seeks to provide a drive for tension rolls incorporating differential gear systems for all rolls but one in any one bridle and means for automatically regulating and adjusting the speed and/or torque of each of the differentially driven rolls with reference to a direct coupled roll in the group or bridle which is itself driven at a predetermined reference speed corresponding to the speed of the sheet metal itself. Preferably, in accordance with the practice of the invention the speed of each differentially driven roll is itself controlled by a sensor mounted on the drive shaft of the roll immediately preceding it or immediately following it in the roll train. Such a sensor may take the form of a straight forward tachometer, or may be in the form of a torque strain sensor. In this way, the speed of rotation and/or torque of each of the rolls in each of the bridles is controlled and synchronized with the speed of the sheet metal as it moves in unison with that particular roll, thereby minimizing and substantially eliminating any possibility of slippage between the roll and the sheet metal.

More particularly, it is an objective of the invention to provide a differential drive system having the foregoing advantages incorporating sensors sensing the speed of one roll in each of the two bridles, and control means for receiving a signal from said sensing means and varying the speed of one bridle with respect to the other.

More particularly, it is an objective of the present invention to provide a differential drive system having the foregoing advantages incorporating variable control means between each such sensor and its associated differential drive, whereby the speed and/or torque of each roll may be adjustably controlled and brought into substantially precise correspondence with the speed of sheet metal passing therearound.

More particularly, it is an objective of the present present invention to provide a differential drive system having the foregoing advantages in which the differtial drive systems comprise differential gears, such as planetary gear systems controlled by auxiliary control motors, each of the auxiliary control motors being in turn responsive to respective sensors. In an alternate form of the invention the differentials may be controlled by means of torque sensors in the main drive shaft powering each group or bridle of rolls, and an electrical proportioning device proportioning the signal from the torque sensor as between the respective differential control motors.

The foregoing and other objectives of the invention will become apparent from the following description of a preferred embodiment of the invention which is given here by way of example only, with reference to the following drawings.

DETAILED DESCRIPTION OF A PREFERRED EMBODIMENT

Figure 1:
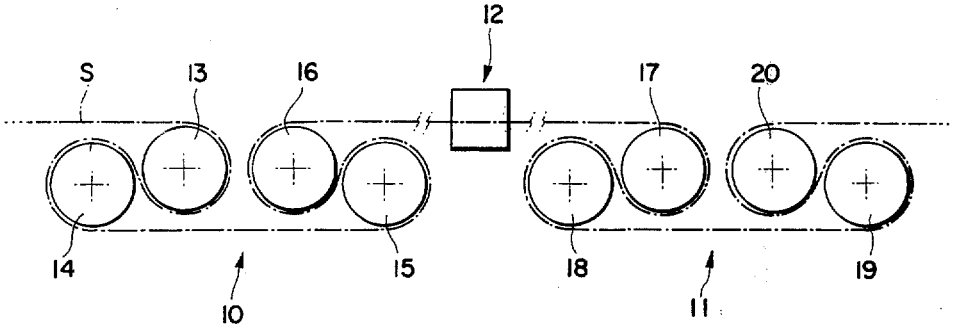
FIG. 1 is a schematic side elevational view of two sets of tension rolls located on either side of a strip sheet metal treatment unit, all being shown schematically.

Referring now to FIG. 1, it will be seen that this illustration shows in schematic form two sets or so-called bridles of tension rolls referred to as 10 and 11, arranged on either side of a strip sheet metal treatment unit, the details of which are omitted for the sake of clarity, and which is referred to by the general reference arrow 12. A strip of sheet metal is shown as S, and will be seen to pass around the first bridle or set of rolls 10, and then through the treatment unit 12, and then to the second bridle or set of rolls 11. It will be seen that the arrangement [of the rolls] is such that the first [set of rolls 10 comprises a first] *bridle 10 has two pairs of rolls namely* upper [roll 13 and a first lower roll 14] *and lower rolls 13 and 14*, and [a second] *upper and* lower [roll] *rolls 15 and 16* [, and a second upper roll 16]. It will be noted that the sheet metal passes first around the upper roll 13 and then around the lower roll 14 and then around the second lower roll 15 and then around the adjacent upper roll 16, and then passes through the treatment unit 12. Similarly, the second bridle 11 will be seen to consist of [the first] *two pairs of rolls namely* upper [roll 17, the first] *and* lower [roll] *rolls 17* and 18, [the second] *and upper and lower* [roll] *rolls* 19 *and 20*, [and the second upper roll 20], the sheet metal S passing around the rolls 17, 18, 19 and 20 in that order, in the same way as in the first bridle 10. In this way, the sheet metal S is tensioned between the two bridles 10 and 11, so that when passing through the treatment unit 12, the strip S is under a predetermined lengthwise stress, thereby contributing significantly to the effect of the treatment within the unit 12.

It will of course be understood that the arrangement of bridle 10 and 11, and the use of a treatment unit 12 between two such bridles is very well known in the art, and forms no part of the present invention. Essentially, the treatment unit 12 can consist of a system of leveller rolls, or any other suitable treatment unit requiring the strip metal S to be maintained under constant tension.

Clearly, while this is illustrated as a preferred embodiment, in some cases the two bridles 10 and 11 may be very much further apart, or indeed in certain cases there may be only one such bridle 10 or 11, the tension being provided between such a bridle 10 or 11 and an adjacent treatment unit of a different type in which the strip S is firmly gripped, thereby enabling tension between the one such bridle and the treatment unit, to be maintained if desired.

Figure 2:
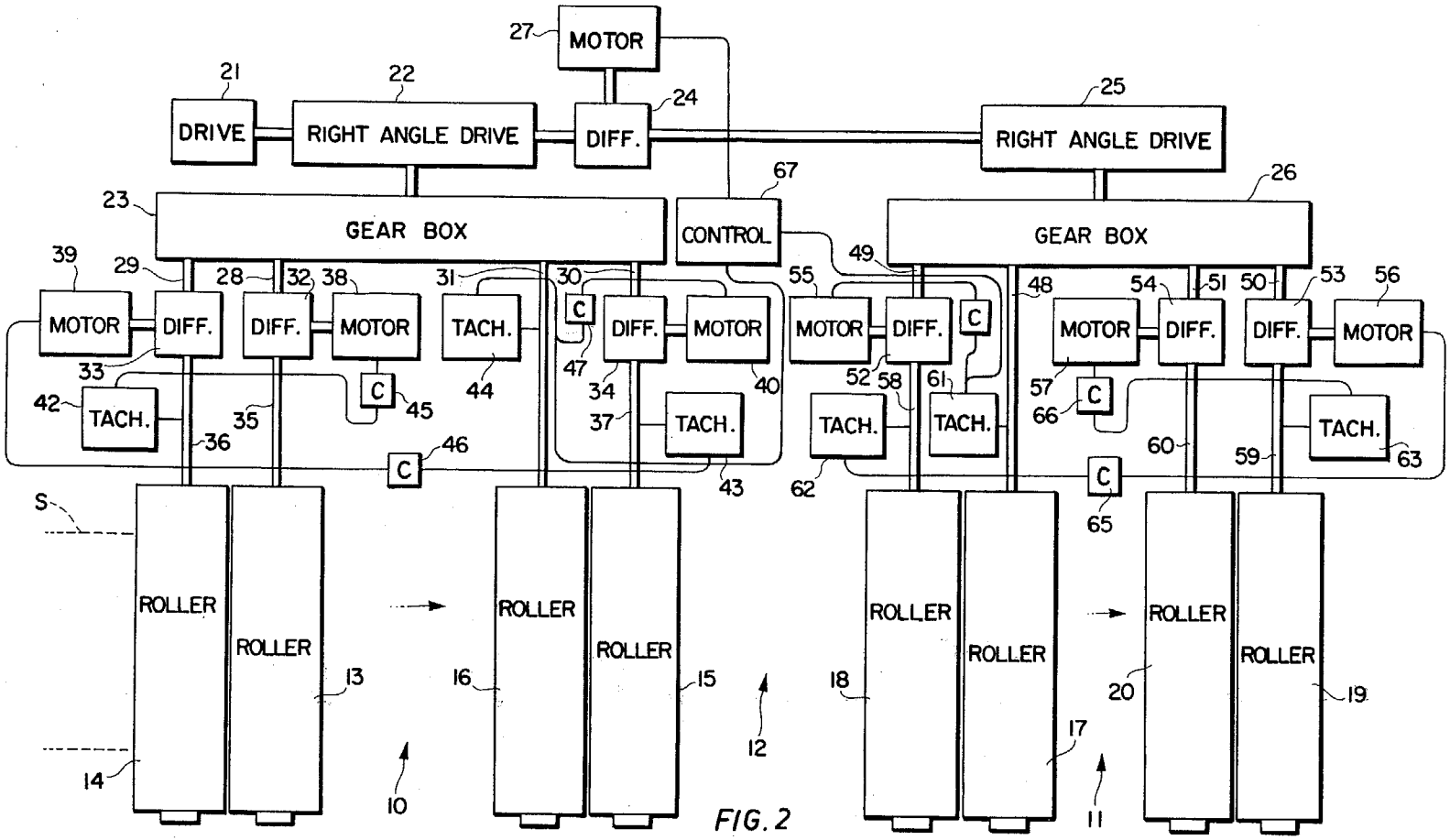
FIG. 2 is a schematic top plan view of the two sets of tension rolls shown in FIG. 1, shown apart from the sheet metal treatment unit.

Referring now to FIG. 2, it will be seen that both bridles 10 and 11 are driven from a common power source by a system of drive shafts and right angle drive and gear boxes which are essentially well known and in conventional use in the art. Thus a drive motor 21 is provided for driving both bridle 10 and 11, the output shaft of which drives one side of a right angle drive gear box 22. One output shaft of the right angle gear box drives the gear box 23 for the bridle 10, and the other output shaft of the right angle drive 22 drives the differential 24. The output shaft of the differential 24 in turn drives the right angle drive 25, the output shaft of which drives the gear box 26 for driving the rolls of bridle 11. The differential 24 may be for example a so-called planetary differential of the type in which the speed of rotation of the output shaft may be subjected to infinite variation over a predetermined range with relation to the speed of rotation of the input shaft, by means of rotation of the planetary cage, or may be a bevel gear system. Planetary differentials are well known in the art but are described herein in some detail for the sake of clarity with reference to FIG. 4. For the moment however it is sufficient for the purposes of this explanation to state that the speed of rotation of the output shaft may be varied by means of the auxiliary motor 27, so that the output shaft of the differential 24 may be either speeded up or slowed down with reference to the speed of rotation of the input shaft.

The gear box 23 is provided with four output shafts 28, 29, 30 and 31, all of which rotate at identical speeds, and, which in the prior art, were connected directly to their respective rolls 13, 14, 15 and 16 for driving the same at identical speeds.

In accordance with the present invention however each of the drive shafts 28, 29, and 30 are connected to respective differentials 32, 33 and 34 whereby the output shafts 35, 36 and 37 may be subjected to a speed of rotation which is different from their respective input shafts 28, 29 and 30. Each of the differentials 32, 33 and 34 are controlled by respective motors 38, 39 and 40 thereby enabling the speed of their respective output shafts 35, 36 and 37 to be either speeded up or slowed with relation to their respective input shafts 28, 29 and 30.

It will be noted that [the last roll] in the train or bridle 10 [i.e.] roll 16 (see FIG. 1) is connected directly to the drive shaft 31, and is not provided with any differential. Thus the speed of rotation of the roll 16 will always be identical to the speed of rotation of its drive shaft 31.

*The speeds of the other rolls are thus variable as described below with respect to such direct drive roll 16 which is therefore referred to as the "first" roll, of the bridle, the remaining rolls 15, 14 and 13 being respectively the second, third and fourth rolls of the bridle.*

Figure 5:
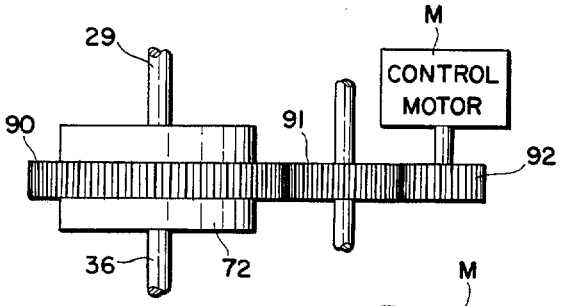
FIG. 5 is a schematic top plan view of an alternate mode of operating the differential drive system of FIG. 4.

Each of the respective motors 38, 39 and 40 control their respective differentials 32, 33 and 34 in this particular type of variable speed system by actually rotating the planetary cage of the differential gear system, as shown and described in connection with FIGS. 4 and 5 below. In order to control the operation of each of the motors 38, 39 and 40, sensor means are provided for sensing the speed of rotation of the next adjacent roll in the bridle or roll train. In the cass of the embodiment of FIG. 1, the sensor means comprise the tachometers 42, 43 and 44 which are respectively connected to the output shaft 36 and 37, and the drive shaft 31, driving respectively the rolls 14, 15 and 16. Note that the first roll 13 in the bridle or roll train 10 is not provided with any tachometer or sensor, and the motor 38 controlling the differential 32 driving the output shaft 35 for the first roll 13 is itself controlled by means of the tachometer 42 connected to the output shaft 36 driving the roll 14. Similarly, the motor 39 controlling the differential 33 is itself controlled by the tachometer 43 connected to the output shaft 37 driving the roll 15. Similarly, the motor 40 controlling the differential 34 and the output shaft 37 which drives the roll 15 is itself controlled by the tachometer 44 which is connected to the drive shaft 31 driving the roll 16. Note also that the output shaft 31 as described above is not provided with any differential, whereby the output shaft is in fact driving the roll 16 at a speed corresponding to the speed of the sheet metal moving therearound.

In this way, it will be seen that the three differentials 32, 33 and 34 operate in a cascade manner, that is to say, the output speed of each differential is a function of the speed not only of the next immediately preceding differential, but all preceding differentials in the train.

Since it is not possible to obtain perfect matching of each tachometer and each motor for all purposes and functions of the apparatus, it is found desirable to provide variable control means such as the control boxes 45, 46 and 47, the control box 45 being located between the motor 38 and the tachometer 42, and the control box 46 being located between the motor 39 and the tachometer 43, and the control box 47 being located between the motor 40 and the tachometer 44. The control boxes may be of any suitable kind, for example containing a variable resistor, whereby the signal strength produced by the tachometer is either increased or decreased, or any other suitable means known in the art.

The arrangement of the second roll train or bridle 11 is essentially a mirror image of the bridle 10. Thus gear box 26 drives four drive shafts 48, 49, 50 and 51 at identical speeds. The drive shaft 48 is connected directly to its roll 17 which therefore rotate at a uniform speed. The drive shafts 49, 50 and 51 are provided respectively with differential gears 52, 53 and 54. The differentials are similarly provided with control motors 55, 56 and 57.

The differentials 52, 53 and 54 are connected by means of output shafts 58, 59 and 60 to respective rolls 18, 19 and 20. The control motors in turn are connected to respective tachometers 61, 62 and 63, and between the motors and their respective tachometers, suitable variable control means are provided in the form of the control boxes 64, 65 and 66.

*Again, the roll 17 of the second bridle is directly driven without a differential and is therefore considered as the first roll of the second bridle, the speeds of the remaining rolls being variable with respect to the speed of roll 17. The remaining rolls 18, 19 and 20 are respectively the second, third and fourth rolls of the second bridle.*

As described above, the drive to the two gear boxes 23 and 26 for the two bridles 10 and 11 originates from the same drive motor 21. In order to provide for a different speed between gear boxes 23 and 26, the differential 24 is located between the right angle box 22 and the right angle box 25. The differential 24 is itself provided with an auxiliary control motor 27 as noted above, and in order to provide for regulation of the output of the differential 24, the motor 27 is controlled by the two tachometers 44 and 61. The signals from these two tachometers are fed to the control box 67, so that the speeds of the two rolls 16 and 17 may be compared, and the difference between the two signals is used to control the operation of the motor 27, thereby varying the speed of the output of the differential 24 in proportion to the difference between the speeds of the two rolls 16 and 17.

Note that as shown in FIG. 1, the strip S of sheet metal passes directly from the roll 16 of the first bridle

10 to the roll 17 of the second bridle 11, and both rolls 16 and 17 are driven directly by their respective shafts 31 and 48 from their respective gear boxes 23 and 26. No differential gear systems are provided for driving either of these two rolls, since their relative speed may be varied by variation of the output of the differential 24 as described above.

Note also that the speeds of the other rolls in each of the bridles 10 and 11 are derived from the speeds of the respective "*first*" rolls 16 and 17 [ . ] *of each bridle 10 and 11.*

In operation, the strip S of sheet metal passes first over the roll 13 then to the roll 14, then to the roll 15, then around the roll 16 and through the strip treatment unit 12, and then is fed to the second bridle 11 where it passes first around the roll 17, then around the roll 18, then around the roll 19 and finally around the roll 20. Obviously, the major variation in speeds will occur between the speeds of the rolls 16 and 17, since the major elongation of the strip S will take place between these two rolls. By suitable operation of the control 67, the operator can therefore being the speeds of the rolls 16 and 17 into very close correspondence to the speed of the strip S. The operator will then adjust the controls 47, 46 and 45 in that order to bring the remaining rolls in the bridle 10 into the correctly adjusted speeds, and will then similarly adjust the controllers 64, 65 and 66 in that order to adjust the speeds of the remaining rolls in the second bridle 11.

By this means, it is possible for an operator with very little practice to bring the speeds of all of the rolls in both bridles into very close correspondence with the speed of the strip S as it moves around each particular roll.

While this embodiment of the invention has been described in connection with two bridles 10 and 11, and a strip metal treatment unit 12 located between the two bridles, it will of course be understood that the invention is equally applicable to the use of one bridle if it should be so desired.

In certain cases, it may be possible to provide for a somewhat simpler form of control of the various differentials and their control motors, while yet achieving essentially the same advantages as are achieved in the embodiment of FIGS. 1 and 2.

Figure 3:
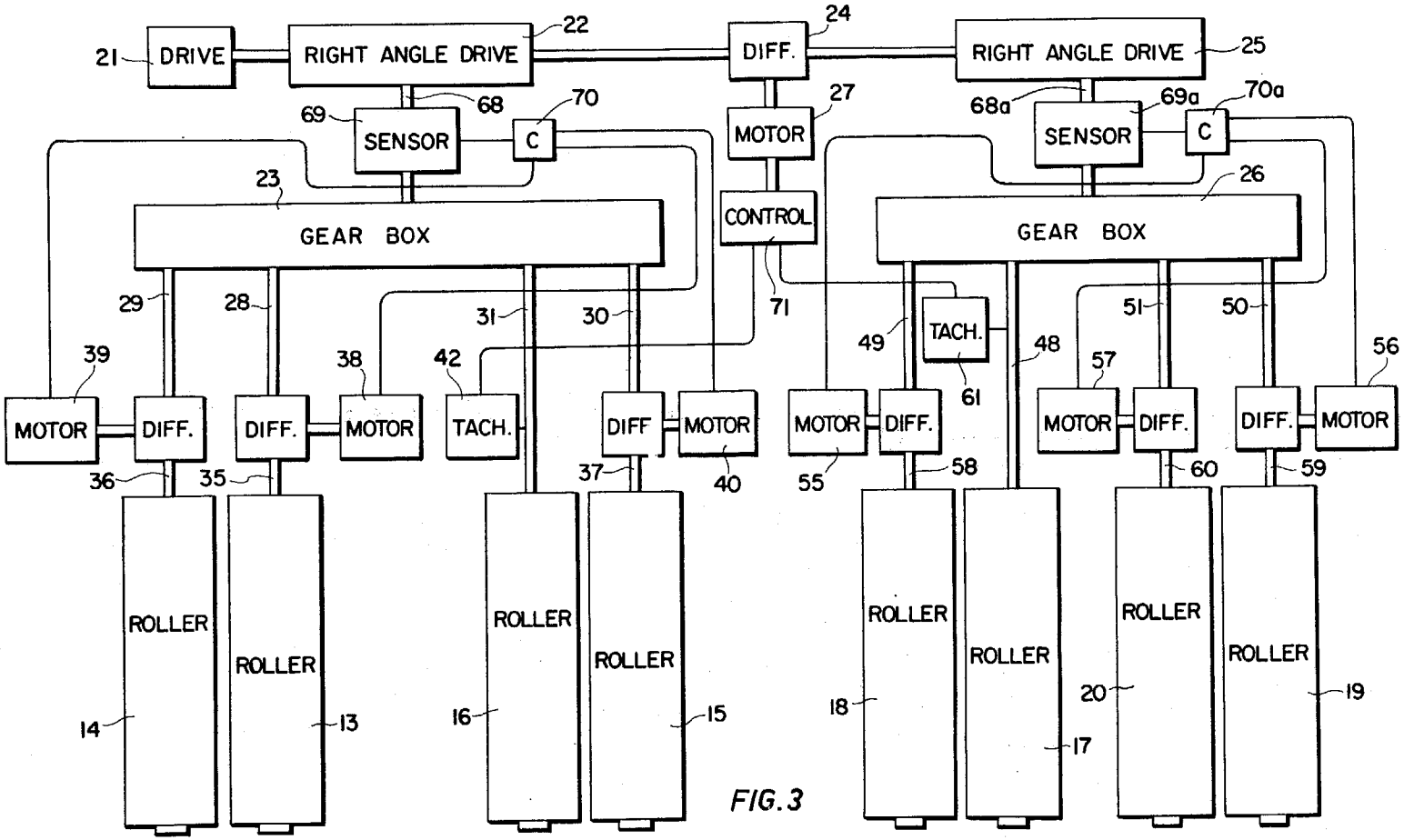
FIG. 3 is a schematic top plan view of a further embodiment of the invention.

According to this alternate embodiment, as illustrated in FIG. 3, the same rolls 14 to 20 are driven through the same gear boxes 23 and 26 by the same right angle drive 22 and 25, differential 24 and drive motor 21. Similarly, rolls 13, 14 and 15 are provided with respective differentials and control motors, and roll 16 is provided on its drive shaft 31 with a tachometer. Similarly, on the second bridle 11 the rolls 18, 19 and 20 are provided with differentials, and control motors, and the roll 17 on its drive shaft 48 is provided with a tachometer.

Note however, that the rolls 14 and 15 and 18 and 19 are not provided with tachometers. Instead, according to this alternate embodiment of the invention, the drive shaft 68 from right angle drive 22 is connected to a torque sensing unit 69, and the drive shaft 68A from the right angle 25 is provided with a torque sensing unit 69A. The torque sensing unit may be of any suitable known design, such as the unit known as the "Torductor" (trade mark) manufactured by A.S.E.A. Company of Sweden.

The torque sensing unit 69 will be electrically connected to the control motors 38, 39 and 40 and the torque sensing unit 69A will be electrically connected to the control motors 55, 56 and 57 through the adjustable proportioning control boxes 70 and 70a in such a manner that the overall torque signal produced by the torque sensing unit in response to the torque in the respective shafts 68 and 68a is proportioned as between the three motors connected to it so as to operate the three motors at constant differing speed ratios thereby bringing the speed of their respective rolls into fairly close coincidence with the speed of the strip metal moving in contact with each roll.

In order to accurately proportion the drive as between the one bridle 10 and the other bridle 11, the two tachometers 42 and 61 are connected to a control box 71 which in turn controls the motor 27 controlling the differential 24. The control box 71 is such that it determines the difference between the two tachometer signals, and controls the operation of the motor 27 whereby to procure a proportioning of the drive between the bridles 10 and 11 so as to maintain the respective rolls 16 and 17 at a predetermined speed differential corresponding to the speed of the strip metal in contact with the respective rolls. Thus in this alternate embodiment of the invention, a predetermined ratio of speeds will be maintained between the various rolls regardless of differences in torque in the main drive shafts 68 and 68a and such speeds will be in close coincidence with the actual speed of the strip metal in contact with the various rolls. The differential gear system shown as 24, 32, 33, 34 and 52, 53, 54, may be of any suitable type in which the speed of the output shaft is a function of the main drive shaft speed, and the speed of its particular control motor. Typically, such differentials will be of the planetary gear or bevel gear cage type in which the output shaft speed may be varied by applying the motor drive to driving the gear cage either in the forward or the reverse direction thereby either speeding up or slowing down the output in a predetermined ratio. However, the invention is not to be exclusively confined to such a planetary type or other differential, and any other variable speed drive system which will provide the same function of a controlled variation of speed of the output shaft, may be substituted in place of the planetary or bevel gear type differential and is to be considered as within the scope of the invention.

Figure 4:
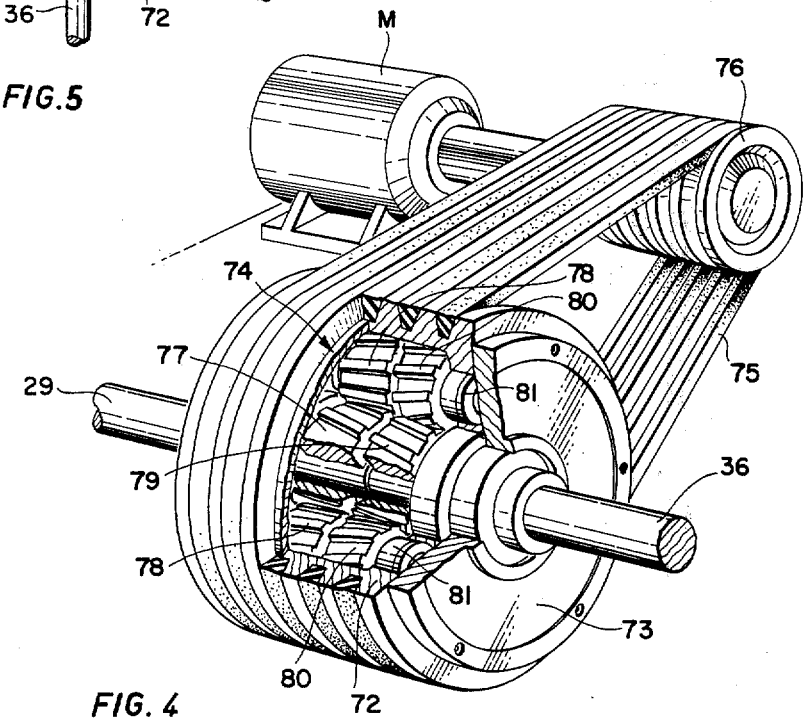
FIG. 4 is a partially cut away perspective view of the differential drive system employed in the practice of the invention.

Referring now to FIG. 4, such a planetary type differential is shown in perspective, and will be seen to comprise an input drive shaft 29, an output driven shaft 36, shafts 29 and 36 being essentially exemplary and shown here for the sake of illustration. The differential further comprises a generally cylindrical outer casing 72, closed at each end by disc members 73, and a plurality of annular V-shaped drive belt grooves 74 are provided around the exterior of the casing 72 for engagement by the drive belts 75. A control motor M is provided having a multiple drive pulley 76, and adapted for driving the belts 75 at any desired speed, controllable by control means (not shown) but which in the case of the present invention clearly will comprise the tachometers and control boxes in the one case, or the torque sensors in the other case.

Within the casing a first sun gear 77 is keyed to the shaft 29, and meshes with three planetary gears 78 (only two being shown in this illustration for the sake of clarity). A second sun gear 79 is keyed to drive the output driven shaft 36, and is co-axial with the sun gear 77. Sun gear 79 meshes with three planetary gears 80. All of the planetary gears 78 and 80 are mounted in pairs on common shafts 81 which are mounted in fixed relation to the casing 72, and with which they form a planetary gear cage and all move in unison as a single unit.

Clearly, when the drive shaft 29 is rotated the sun gear 77 will rotate with it, thereby driving the planetary gears 78 in the reverse direction. Rotation of the planetary gears 78 will cause the entire cage system comprising the shafts 81 and the casing 72 to rotate around the axis defined by the drive and driven shaft 29 and 36. Such rotation will of course cause the planetary gears 80 to drive the sun gear 79, thereby causing rotation of the driven shaft 36. Assuming no power is applied to motor M, then the outer casing 72 will rotate freely and the speed of the driven shaft 36 will be the same as the speed of the drive shaft 29. However, if power is applied to the motor M so as to drive it at a speed faster than that at which it is freely rotated in response to rotation of the casing 72, then the casing 72 will rotate somewhat faster, thereby speeding up the driven shaft 36 with relation to the drive shaft 36. Conversely, if the motor M is energized in such a way as to apply a retarding force, then the casing 72 will slow down therefore slowing the output of the driven shaft 36.

Clearly, the differentials of the type shown in FIG. 4 may be operated in a variety of ways, the belt drive as shown in FIG. 4 being only of one such motor operation and not being in any way limiting to the scope of the invention. Thus, as shown in FIG. 5 it will be seen that the differential casing 72 may be provided with a fixed gear 90 mounted around the exterior thereof, which is driven by the control motor M through a drive gear 92 and an idler gear 91.

Other variations are of course within the scope of the invention, and thus other forms of differentials such as are well known in the art require no further description may be employed for producing essentially the same results.

The foregoing is a description of a preferred embodiment of the invention which is given here by way of example only. The invention is not to be taken as limited to any specific feature of the embodiment but comprehends all such variations as come within the scope of the the appended claims.

I claim:

1. A tension roll assembly for a sheet metal working line and comprising:

first and second tension rolls about and between which a sheet metal strip runs;

a motive power source;

a first roll drive transmission operatively extending between said motive power source and said first tension roll to cause rotation of said first tension roll on operation of said motive power source;

a second roll drive transmission operatively extending between said motive power source and said second tension roll to cause rotation of said second tension roll on operation of said motive power source;

a first differential including a main drive input, a main drive output and a control drive input, said first differential being operatively coupled in said second roll drive transmission to transmit drive motion from said motive power source to said second tension roll at a variable speed depending on the magnitude of the control drive to said first differential;

a first variable speed control motor operatively coupled to said control drive input of said first differential;

a first sensor coupled to said first tension roll and operative to provide an output signal indicative of the magnitude of a first roll parameter selected from the rotational speed and the shaft torque of said first tension roll, said first sensor also being operatively coupled to said variable speed control motor to cause variation in the speed of said control motor in response to variation in the magnitude of said first roll parameter, thereby automatically to adjust the speed of the main drive output of said first differential and consequently the speed of said second tension roll driven thereby automatically in response to variaton of the magnitude of said first roll parameter;

*a third tension roll about which the sheet metal strip runs;*

*a third roll drive transmission operatively extending between said motive power source and said third tension roll to cause rotation of said third tension roll on operation of said motive power source;*

*a second differential including a main drive input, a main drive output and a control drive input, said second* differential being operatively coupled in said third roll drive transmission to transmit drive motion from said motive power source to said third tension roll at a variable speed depending on the magnitude of the control drive to said second differential;

a second variable speed control motor operatively coupled to said control drive input of said second differential; and a second sensor coupled to said second tension roll and operative to provide an output signal indicative of the magnitude of a second roll parameter selected from the rotational speed and the shaft torque of said second tension roll, said second sensor also being operatively coupled to said second variable speed control motor to cause variation in the speed of said second control motor in response to variation in the magnitude of said second roll parameter thereby automatically to adjust the speed of the main drive output of said second differential and consequently the speed of said third tension roll driven thereby automatically in response to variation in the magnitude of said second roll parameter.

2. A tension roll assembly as claimed in claim 1 in which said first sensor is a tachometer operatively coupled to said first tension roll to provide an output signal indicative of the magnitude of the rotational speed of said first tension roll.

3. A tension roll assembly as claimed in claim 1 and which additionally comprises:

a fourth tension roll about which the sheet metal strip runs;

a fourth roll drive transmission operatively extending between said motive power source and said fourth tension roll to cause rotation of said fourth tension roll on operation of said motive power source;

a third differential including a main drive input, a main drive output and a control drive input, said third differential being operatively coupled in said fourth roll drive transmission to transmit drive motion from said motive power source to said fourth tension roll at a variable speed depending on the magnitude of the control drive to said third differential;

a third variable speed control motor operatively coupled to said control drive input of said third differential; and a third sensor coupled to said third tension roll and operative to provide an output signal indicative of the magnitude of a third roll parameter selected from the rotational speed and the shaft torque of said third tension roll, said third sensor also being operatively coupled to said third variable speed control motor to cause variation in the speed of said third control motor in response to variation in the magnitude of said third roll parameter thereby automatically to adjust the speed of the main drive output of said third differential and consequently the speed of said fourth tension roll driven thereby automatically in response to variation in the magnitude of said third roll parameter.

[a third tension roll about which the sheet metal strip runs;

a third roll drive transmission operatively extending between said motive power source and said third tension roll to cause rotation of said third tension roll on operation of said motive power source;

a second differential including a main drive input, a main drive output and a control drive input, said second differential being operatively coupled in said third roll drive transmission to transmit drive motion from said motive power source to said third tension roll at a variable speed depending on the magnitude of the control drive to said second differential;

a second variable speed control motor operatively coupled to said control drive input of said second differential; and a second sensor coupled to said second tension roll and operative to provide an output signal indicative of the magnitude of a second roll parameter selected from the rotational speed and the shaft torque of said second tension roll, said second sensor also being operatively coupled to said second variable speed control motor to cause variation in the speed of said second control motor in response to variation in the magnitude of said second roll parameter thereby automatically to adjust the speed of the main drive output of said second differential and consequently the speed of said third tension roll driven thereby automatically in response to variation in the magnitude of said second roll parameter.]

4. A tension roll assembly as claimed in claim 3 which additionally comprises first, second and third, manually operable controls operatively connected between respective ones of said first, second and third sensors and respective ones of said first, second and third variable speed control motors whereby the speeds of the main drive outputs of respective ones of said first, second and third differentials and consequently the speeds of respective ones of said second, third and fourth tension rolls driven thereby can also be manually and individually adjusted.

5. A tension roll assembly as claimed in claim 1 and which additionally comprises a first manually operable control operatively connected between said first sensor and said first variable speed control motor whereby the speed of the main drive output of said first differential and consequently the speed of said second tension roll can also be manually adjusted.

6. A tension roll assembly as claimed in claim 3 and in which said first, second, third and fourth tensions rolls constitute a first bridle of tension rolls and which assembly further comprises:

a second bridle of tension rolls comprising fifth, sixth, seventh and eighth tension rolls around and between which the sheet metal strip runs, such strip passing directly from said first tension roll of said first bridle to said fifth tension roll of said second bridle;

a second bridle drive transmission including fifth, sixth, seventh and eighth roll drive transmissions and extending between said motive power source and said second bridle to cause rotation of respective ones of said fifth, sixth, seventh, and eighth tension rolls on operation of said motive power source;

fourth, fifth and sixth differentials, each including a main drive input, a main drive output and a control drive input and being operatively coupled in respective ones of said sixth, seventh and eighth roll drive transmission to transmit drive motion from said second bridle drive transmission to respective ones of said sixth, seventh and eighth tension rolls of said second bridle at variable speeds depending on the magnitudes of the control drives to respective ones of said differentials;

fourth, fifth and sixth variable speed control motors operatively coupled to said control drive inputs of respective ones of said fourth, fifth and sixth differentials;

fourth, fifth and sixth sensors coupled to respective ones of said fifth, sixth and seventh tension rolls and operative to provide output signals indicative of the magnitudes of roll parameters selected from the rotational speeds and the shaft torques of respective ones of said fifth, sixth and seventh tension rolls, said sensors also being operatively coupled to respective ones of said fourth, fifth and sixth variable speed control motors to cause variations in the speeds of said control motors in response to variations in the magnitudes of respective ones of said parameters, thereby automatically to adjust the speeds of the main drive outputs of respective ones of said fourth, fifth and sixth differentials and consequently the speeds of respective ones of said sixth, seventh and eighth tension rolls automatically in response to variations in the magnitudes of respective ones of said roll parameters;

a bridle drive differential including a main drive input, a main drive output and a control drive input, said bridle drive differential being operatively coupled in said second bridle drive transmission to transmit drive motion from said motive power source to said fifth, sixth, seventh and eighth roll drive transmissions at a variable speed depending on the magnitude of the control drive to said bridle drive differential;

a seventh variable speed control motor operatively coupled to said control drive input of said bridle drive differential; and a control means operatively connected to said seventh variable speed control motor and to each of said first and fourth sensors and adapted to provide an output signal indicative of the difference in magnitude of said roll parameters of said first and fifth tension rolls thereby automatically to adjust the speed of the main drive output of said bridle drive differential and consequently the speeds of all of said fifth, sixth, seventh and eighth tension rolls in response to variation in the magnitude of said difference.

7. A tension roll assembly as claimed in claim 6 and which additionally comprises first, second, third, fourth, fifth and sixth manually operable controls connected between respective ones of said first, second, third, fourth, fifth and sixth sensors and respective ones of said first, second, third, fourth fourth, fifth and sixth variable speed control motors whereby the speeds of respective ones of said second, third, fourth, sixth, seventh and eighth tension rolls can also be manually and independently adjusted.

8. A tension roll assembly as claimed in claim 1 and including:

first and second bridles each in turn including a plurality of tension rolls about and between which the sheet metal strip runs, said first and second tension rolls forming part of said first bridle;

a first bridle drive transmission including said first and second roll drive transmissions;

a second bridle drive transmission operatively extending between said motive power source and said tension rolls of said second bridle to cause rotation of said rolls;

a bridle drive differential including a main drive input, a main drive output and a control drive input, said bridle drive differential being operatively coupled in said second bridle drive transmission to transmit drive motion from said motive power source to said tension rolls of said second bridle at a variable speed depending on the magnitude of the control drive to said bridle drive differential;

a second variable speed control motor operatively coupled to said control drive input of said bridle drive differential;

a second sensor coupled to a selected one of said tension rolls of said second bridle and operative to provide a signal indicative of the magnitude of a roll parameter selected from the rotational speed and the shaft torque of said selected one of said tension rolls of said second bridle;

a control means operatively coupled to said first and second sensors to provide an output signal indicative of the difference between the magnitudes of said parameters as provided by said first and second sensors, said control means also being operatively coupled to said second variable speed control motor to cause variation of the speed of said second variable speed control motor in response to variation in the magnitude of said difference thereby automatically to adjust the speed of the main drive output of said bridle drive differential and consequently the speeds of said tension rolls of said second bridle.

9. A tension roll assembly as claimed in claim 8 in which said first tension roll is a terminal roll of said first bridle and in which said second sensor is coupled to a tension roll of said second bridle operatively adjacent said first tension roll.

[10. A tension roll assembly as claimed in claim 1 in which said first and second roll drive transmissions jointly comprise a drive-dividing mechanism, a first drive sub-transmission extending from said motive power source to said drive-dividing mechanism, a second drive sub-transmission extending from said drive-dividing mechanism to said first tension roll and a third drive sub-transmission extending from said drive-dividing mechanism to said second tension roll, in which said first sensor is coupled to said first drive sub-transmission to provide an output signal indicative of the magnitude of one parameter selected from the rotational speed and shaft torque of said first drive sub-transmission, and in which said first differential is operatively coupled in said third drive subtransmission.]

[11. A tension roll assembly as claimed in claim 10 which additionally comprises a third tension roll about which the sheet metal strip runs;

a fourth drive sub-transmission extending from said drive-dividing mechanism to said third tension roll to cause rotation of said third tension roll on operation of said motive power source;

a second differential including a main drive input, a main drive output and a control drive input, said second differential being operatively coupled in said fourth drive subtransmission;

a second variable speed control motor operatively coupled to said control drive input of said second differential;

a control operatively coupled between said first sensor and each of said first and second variable speed control motors and adapted automatically to cause variation in the speeds of said control motors in response to variation in the magnitude of said parameter, thereby automatically to adjust the speeds of said third and fourth drive sub-transmission and consequently the speeds of said second and third tension rolls driven thereby automatically in response to variations in the magnitude of said parameter.]

[12. A tension roll assembly as claimed in claim 11 in which said control is adapted to adjust the speeds of said third and fourth drive sub-transmissions to predetermined relative extends in response to variations in the magnitude of said parameter.]

*13. A tension roll assembly for a sheet metal working line and comprising;*

*first, second and third tension rolls about and between which a sheet metal strip runs;*

*a motive power source;*

*a drive-dividing mechanism;*

*a main drive sub-transmission extending from said motive power source to said drive-dividing mechanism;*

*a first branch drive sub-transmission extending from said drive-dividing mechanism to said first tension roll to cause rotation of that roll on operation of said motive power source;*

*a second branch drive sub-transmission extending from said drive-dividing mechanism to said second tension roll to cause rotation of that roll on operation of said motive power source;*

*a third branch drive sub-transmission extending from said drive-dividing mechanism to said third tension roll to cause rotation of that roll on operation of said motive power source;*

*a second roll differential including a main drive input, a main drive output and a control drive input, said differential being operatively coupled in said second branch drive sub-transmission to transmit drive motion from said drive-dividing mechanism to said second tension roll at a variable speed depending on the magnitude of the control drive to said second roll differential;*

*a third roll differential including a main drive input, a main drive output and a control drive output, said differential being operatively coupled in said third branch drive sub-transmission to transmit drive motion from said drive-dividing mechanism to said third tension roll at a variable speed depending on the magnitude of the control drive to said third roll differential;*

*a second roll variable speed control motor operatively coupled to said control drive input of said second roll differential;*

*a third roll variable speed control motor operatively coupled to said control drive input of said third roll differential;*

*a sensor coupled to said main drive sub-transmission to provide an output signal indicative of the magnitude of one parameter selected from the rotational speed and shaft torque of said main drive sub-transmission, and,*

*a proportioning control operatively coupled between said sensor and each of said second and third roll variable speed control motors and adapted automatically to cause variation in the speed output of said second and third roll control motors in response to variation in the magnitude of said output signal from said sensor, thereby automatically to adjust the speeds of said second and third branch drive sub-transmissions and consequently the speeds of said second and third tension rolls respectively driven thereby automatically in response to variations in the magnitude of said parameter.*

*14. A tension roll assembly as claimed in claim 13 wherein the sensor is a torque sensor sensing shaft torque of said main drive sub-transmission, and responsive thereto to produce an overall torque signal, and wherein said torque signal is proportioned by said proportioning control as between said speed control motors as aforesaid.*

*15. A tension roll assembly as claimed in claim 14 including a fourth tension roll, a fourth branch drive sub-transmission connected thereto, having a fourth roll differential, and control motor therefor, said fourth roll control motor being connected to said proportioning control for automatic speed adjustment as aforesaid.*

*16. A tension roll assembly as claimed in claim 15 wherein said first, second and third rollers are incorporated in one bridle, and including a second bridle also including first, second and third tension rolls, and also including similar main and branch transmissions, differentials, control motors and a sensor coupled thereto, and including a common motive power source connected thereto by a bridle drive transmission for said bridles, and including a bridle drive differential coupled to the drive transmission for said second bridle, a control motor for controlling the same, sensors on each of the first tension rolls in each of said bridles sensing a parameter selected from the rotational speed, and the torque thereof, a proportioning control connected to said sensors and to said control motor for said bridle drive differential for automatically varying the speed of the second bridle drive in response to variation in said parameter.*

*17. A tension roll assembly as claimed in claim 16 wherein said first roll sensors are tachometers.*

* * * * *